Patented Apr. 21, 1936

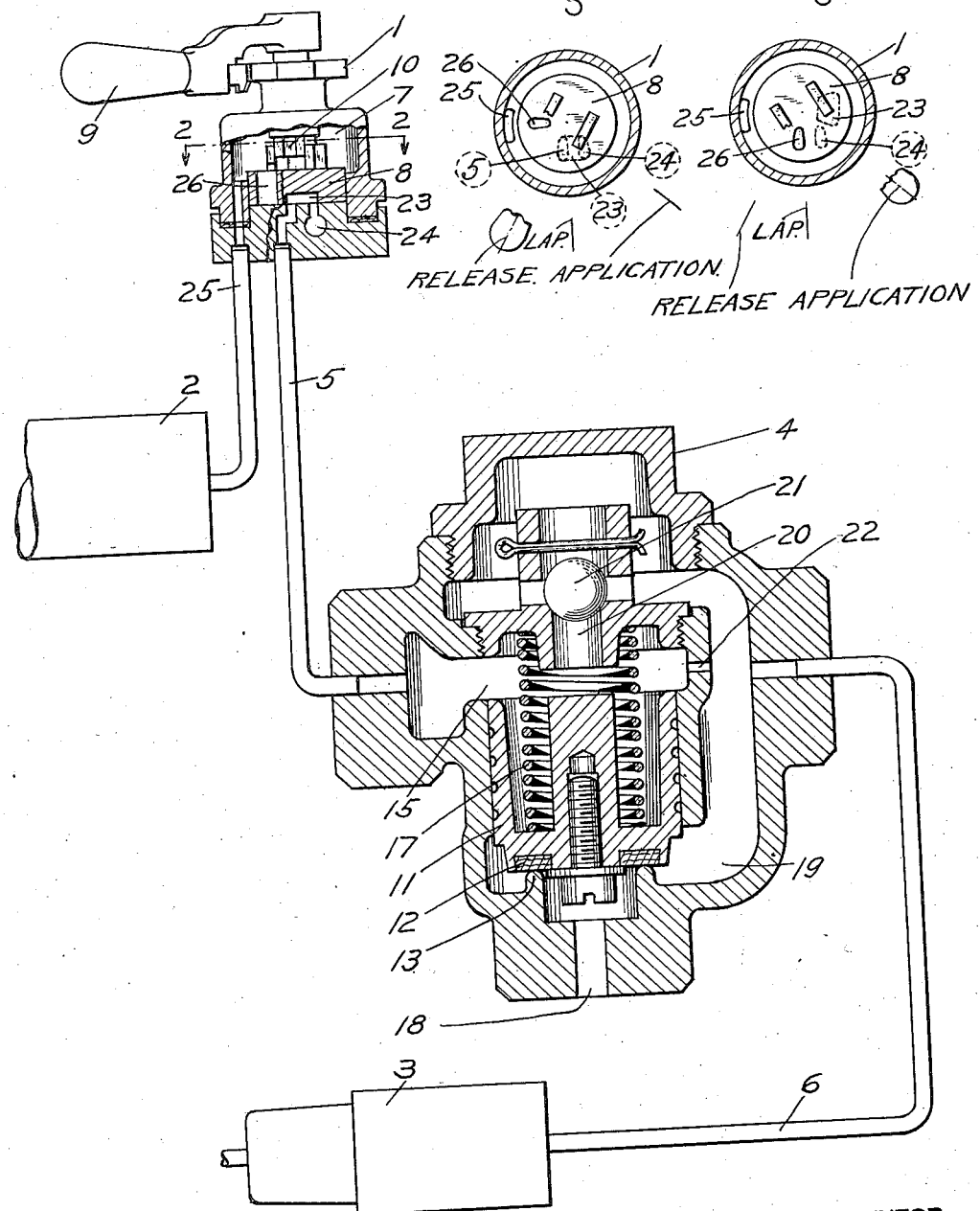

2,038,162

UNITED STATES PATENT OFFICE 2,038,162

QUICK RELEASE VALVE

Norman Geoffrey Cadman, King's Cross, London, England, assignor to The Westinghouse Air Brake Company, Wilmerding, Pa., a corporation of Pennsylvania Application November 17, 1934, Serial No. 753,463
In Great Britain March 23, 1934

10 Claims. (Cl. 303—69)

This invention relates to fluid pressure braking equipment and has for its principal object to provide an improved quick release valve device for use in such equipment.

In fluid pressure braking apparatus in which the brakes are controlled by supplying fluid under pressure to and releasing fluid under pressure from the brake cylinder through a relatively long pipe by the operation of an operator's brake valve device, a delay is experienced in effecting a release of the brakes, and in order to avoid such delay a quick release valve device adapted to release fluid from the brake cylinder at a position relatively near to the cylinder has heretofore been interposed in the pipe connecting the brake valve device to the brake cylinder. Such a quick release valve device usually comprises a release valve influenced by brake cylinder pressure on the one hand and on the other hand by the fluid pressure in the pipe leading to the brake valve device, and is provided with a passage, with a check valve interposed therein, by-passing the release valve, so as to permit the flow of fluid around the release valve only in the direction from the brake valve device to the brake cylinder. In release valve devices of the above type the release valve is arranged to be seated, and then held seated, only when fluid under pressure is supplied to the brake cylinder in order to effect an application of the brakes, and there is a possibility of the fluid passing to the atmosphere past the unseated release valve instead of to the brake cylinder in the event of the release valve sticking in the unseated position.

According to one feature of the present invention, however, the quick release valve, which is arranged to be influenced on the one hand by the brake cylinder pressure and on the other hand by the fluid pressure in the pipe leading to the brake valve device, is arranged to be held normally seated by means of a light spring or its equivalent so that when fluid is supplied to the brake cylinder in order to effect an application of the brakes the quick release valve is already seated and is only applied more firmly to its seat by such fluid.

According to a further feature of the invention a by-pass passage, permitting the release, in certain circumstances, of fluid from the brake cylinder under the control of and through the operator's brake valve device independently of the quick release valve, is provided around the quick release valve, thus enabling the operator to graduate the release of the brakes and thus have better control of the braking action.

In order that the invention may be readily understood an embodiment thereof will now be described, by way of example, with reference to the accompanying drawing in which:—

Figure 1 is a diagrammatic view of a fluid pressure brake equipment embodying the improved quick release valve device which is shown in section.

Figure 2 is a sectional view of the brake valve device shown in Figure 1 with the parts shown in release position.

Figure 3 is a sectional view similar to Figure 2 but with the parts shown in application position.

As shown in the drawing the fluid pressure brake equipment comprises a brake valve device 1, a main reservoir 2, a brake cylinder 3, and a quick release valve device 4 connected to the brake valve device 1 by means of a pipe 5 and connected to the brake cylinder 3 by means of a pipe 6.

The brake valve device 1 may be the usual type comprising a casing having a chamber 7 in constant communication with a main reservoir 2 through a pipe 25, the chamber 7 containing a rotary valve 8 adapted to be turned to various brake controlling positions by means of a handle 9 which is connected to the rotary valve 8 through the medium of an operating shaft 10.

The quick release valve device 4 comprises a casing containing a quick release valve, preferably in the form of a valve piston 11 carrying a valve member 12 adapted to cooperate with a valve seat rib 13 provided in said casing, the upper face of the valve piston 11 being subject to the fluid pressure obtaining in a chamber 15 which is permanently connected to the brake valve device 1 through pipe 5. Under normal conditions the quick release valve 11 is held seated by means of a light spring 17 contained in the chamber 15 and under these conditions the seated area of the quick release valve 11 within seat rib 13 is subject to atmospheric pressure through an exhaust port 18 in the the casing 4, while the area of said quick release valve outside of seat rib 13 is subject to the fluid pressure obtaining in a chamber 19 which is permanently connected to the brake cylinder 3 through pipe 6.

A passageway 20, in which there is disposed a ball check valve 21 provides a one-way flow communication from chamber 15 to chamber 19, while a relatively small by-pass passage 22 provides a two-way communication between said chambers.

In operation, fluid under pressure is supplied to the main reservoir 2 in the usual manner and flows from said main reservoir to rotary valve chamber 7 in the brake valve device 1. With the brake valve 1 in release position, as shown in Figs. 1 and 2 of the drawing, a cavity 23 establishes communication between pipe 5 and an atmospheric vent passage 24 so that the brake cylinder 3, which is in communication with pipe 5 by way of pipe 6, chamber 19, passage 22 and chamber 15 in the quick release valve device 4, is open to the atmosphere and therefore at atmospheric pressure. With the brakes thus released, the quick release valve 11 is subject on its opposite faces to atmospheric pressure, and said quick release valve is urged into engagement with seat rib 13 by the light pressure of spring 17.

In order to effect an application of the brakes, the brake valve handle 9 and thereby rotary valve 8 is turned to application position, in which said rotary valve assumes the position shown in Fig. 3. In this position of rotary valve 8, an application port 26 extending through said rotary valve registers with pipe 5, so that fluid under pressure from the rotary valve chamber 7 and thereby main reservoir 2 is permitted to flow to pipe 5 and from thence through chamber 15, passageway 20, chamber 19 and pipe 6 to the brake cylinder 3, and some fluid also flows to the brake cylinder 3 from the chamber 15 by way of the by-pass passage 22 and chamber 19. The increased fluid pressure obtaining in the chamber 15 assists the light spring 17 in holding the quick release valve piston 11 seated, thus preventing the escape of fluid from the brake cylinder 3 to the atmosphere through the atmospheric port 18.

If now it is desired to effect a gradual release of the brakes the brake valve device is moved toward the release position until pipe 5 is partly opened to cavity 23 in the rotary valve 8 which permits a relatively slow rate of release of fluid from the brake cylinder 3 through pipe 6, chamber 19, by-pass passage 22, chamber 15, pipe 5 and from thence through the brake valve device 1 to the atmosphere through passage 24. The quick release valve 11 remains seated in effecting a release of brakes in the manner just described, since the flow capacity of the by-pass passage 22 is such as to prevent a sufficient reduction in pressure in chamber 15 at one side of the valve piston 11 as to permit brake cylinder pressure in chamber 19 acting on the other side of said valve piston to move said valve piston out of engagement with seat rib 13. If, however, it is desired to effect a quick release of the brakes the brake valve device 1 is moved all the way to release position so that pipe 5 is fully opened to cavity 23 which permits a relatively rapid rate of release of fluid under pressure from the chamber 15 of the release valve device, that is to say, at such a rate that the pressure obtaining in the chamber 15 cannot be maintained by flow of fluid through the by-pass passage 22 from the brake cylinder 3, with the result that brake cylinder pressure acting in chamber 19 on the opposite side of the valve piston 11 outside of the seat rib 13 shifts said valve piston out of engagement with said seat rib and thereby permits a rapid venting of fluid under pressure from the brake cylinder 3 through chamber 19, past the lower face of valve piston 11 to passage 18 and from thence to the atmosphere.

It will be noted that according to the invention, spring 17 will ensure that the quick release valve 11 will be seated when an application of the brakes is initiated and thereby preclude the possibility of losing fluid under pressure supplied by the brake valve device to the brake cylinder 3, and it will further be noted that the by-pass passage 22 will permit a gradual and more positive control of the release of fluid under pressure from the brake cylinder 3 than is obtainable past the relatively large venting capacity quick release valve 11. Furthermore, the by-pass passage 22 will maintain the brake cylinder 3 completely vented when the brake valve device 1 is in release position and after the quick release valve 11 is urged to its seat by spring 17.

It will be evident that the invention is not limited to the particular construction and arrangement of the parts hereinbefore described which may be varied as desired to suit particular requirements without exceeding the scope of the invention.

Having now described my invention, what I claim as new and desire to secure by Letters Patent, is:

1. In a fluid pressure brake, in combination, a brake cylinder, and a quick release valve for controlling the release of fluid under pressure from the brake cylinder and subject on one side to brake cylinder pressure and on the opposite side to the pressure of fluid in a chamber through which fluid under pressure is supplied to and adapted to be released from the brake cylinder, said valve being movable by brake cylinder pressure acting on the one side, when fluid is released from said chamber at a greater rate than the pressure in the brake cylinder is reduced, for releasing fluid from said brake cylinder.

2. In a fluid pressure brake, in combination, a brake cylinder, a quick release valve for controlling the release of fluid under pressure from the brake cylinder and subject on one side to brake cylinder pressure and on the opposite side to the pressure of fluid in a chamber through which fluid under pressure is supplied to said brake cylinder, said valve being movable by brake cylinder pressure acting on the one side, when fluid is released from said chamber, for releasing fluid under pressure from said brake cylinder, and a spring acting on said valve urging said valve to close the release communication to said brake cylinder.

3. In a fluid pressure brake, in combination, a brake cylinder, a quick release valve for controlling the release of fluid under pressure from the brake cylinder and subject on one side to brake cylinder pressure and on the opposite side to the pressure of fluid in a chamber through which fluid under pressure is supplied to said brake cylinder, said valve being movable by brake cylinder pressure acting on the one side, when fluid is released from said chamber, for releasing fluid under pressure from said brake cylinder, a spring urging said valve to close the release communication to said brake cylinder, and a brake valve device for supplying and releasing fluid under pressure to and from said chamber.

4. In a fluid pressure brake, in combination, a brake cylinder, a quick release valve for controlling the release of fluid under pressure from the brake cylinder and at all times subject on one side to brake cylinder pressure and on the opposite side to the pressure of fluid in a chamber, a communication through which fluid under pressure is adapted to be supplied from said chamber to said brake cylinder, and means for preventing back flow of fluid under pressure through said communication said valve being operated upon a reduction in pressure in said chamber to release fluid under pressure from said brake cylinder.

5. In a fluid pressure brake, in combination, a brake cylinder and a quick release valve device comprising valve means for controlling the release of fluid under pressure from the brake cylinder and subject on one side to brake cylinder pressure and on the opposite side to the pressure of fluid in a chamber, a one-way flow communication connected to said chamber through which fluid under pressure is adapted to be supplied from said chamber to said brake cylinder at a rapid rate, a two-way flow communication connected to said chamber through which fluid under pressure is adapted to be supplied to and released from said brake cylinder at a relatively restricted rate, said valve means being operated by brake cylinder pressure when fluid is released from said chamber at a greater rate than brake cylinder pressure reduces through said two-way flow communication for releasing fluid under pressure from said brake cylinder.

6. A quick release valve device comprising a casing having two chambers and an exhaust port of relatively large flow capacity opening to one of said chambers, a movable abutment subject to and controlled by the opposing pressures in said chambers, a valve secured to one side of and movable at all times with said abutment for controlling communication through said exhaust port, and a two-way flow communication between said chambers having a relatively restricted flow capacity.

7. A quick release valve device comprising a casing having two chambers and an exhaust port of relatively large flow capacity opening to one of said chambers, a movable abutment subject to and controlled by the opposing pressures in said chambers, a valve secured to one side of and movable at all times with said abutment for controlling communication through said exhaust port, a spring for urging said valve to close communication through said exhaust port, and a two-way flow communication between said chambers having a relatively restricted flow capacity.

8. A quick release valve device comprising a casing having two chambers and an exhaust port opening into one of said chambers, a piston subject to the opposing pressures of said chambers a valve for opening and closing said exhaust port, said valve being secured to and movable at all times with said piston, a spring for urging said valve to the position for closing said exhaust port, a passageway connecting said chambers, and a check valve interposed in said passageway adapted to prevent flow of fluid under pressure from the chamber which is open to the exhaust port to the other chamber.

9. A quick release valve device comprising a casing having two chambers and an exhaust port opening into one of said chambers, valve means controlled by the opposing pressures of said chambers for controlling communication through said exhaust port, a passageway having a relatively large flow capacity connecting said chambers, a check valve in said passageway adapted to prevent flow of fluid from the chamber which is open to said exhaust port to the other chamber, and another passage having a relatively restricted flow capacity establishing two-way communication between said chambers.

10. A quick release valve device comprising a casing having two chambers and an exhaust port opening into one of said chambers, valve means controlled by the opposing pressures of said chambers for controlling communication through said exhaust port, means establishing a relatively restricted flow communication in the direction from the chamber adapted to be connected to said exhaust port to the other chamber, and means establishing a relatively large flow communication in the opposite direction.

NORMAN GEOFFREY CADMAN.